(No Model.)
P. G. STRICKLER.
HAY ELEVATOR.
No. 356,431. Patented Jan. 18, 1887.
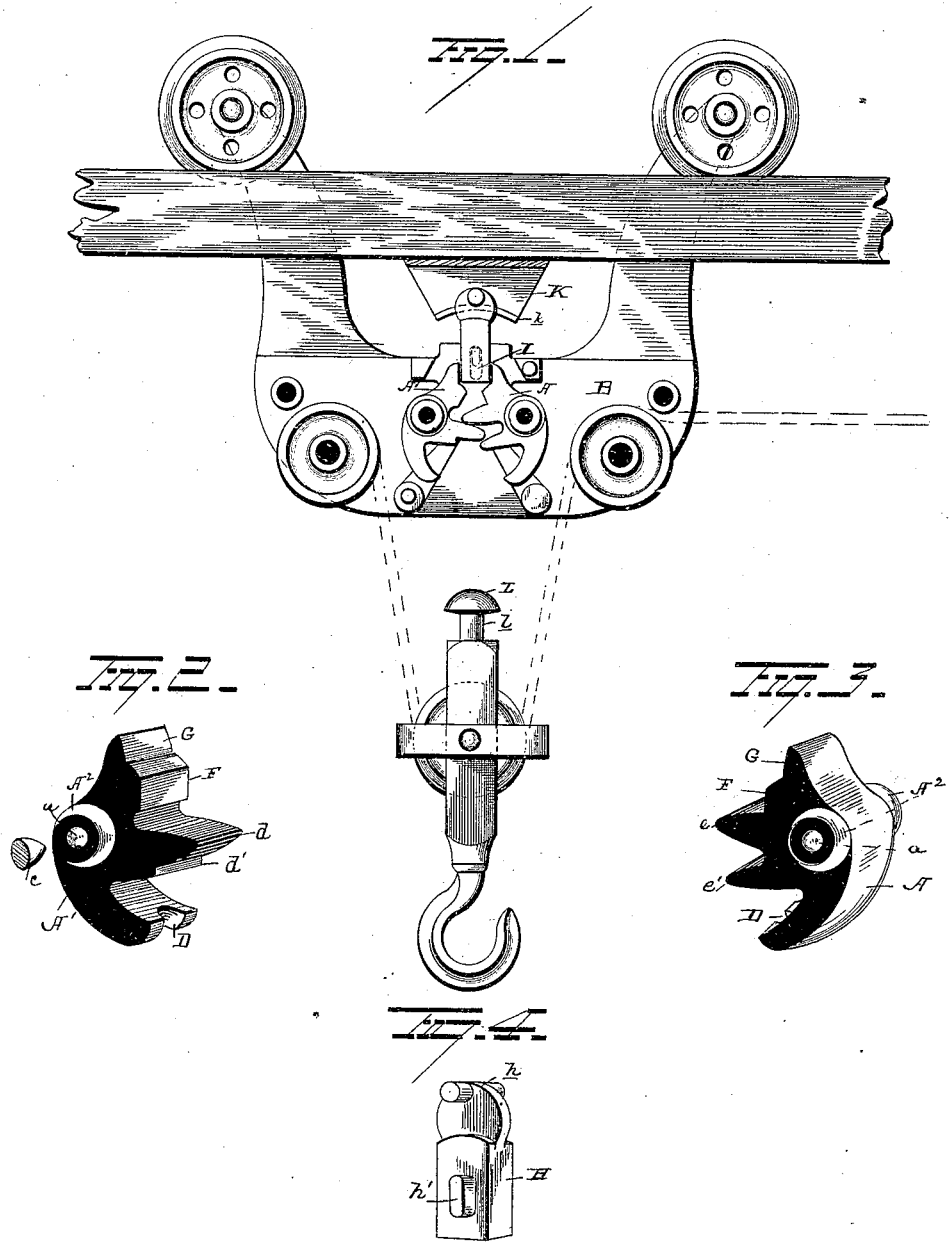
WITNESSES
Geo. F. Downing.
S. G. Nottingham.
INVENTOR
P. G. Strickler.
By H. A. Seymour, Attorney

UNITED STATES PATENT OFFICE.

PETER G. STRICKLER, OF JANESVILLE, WISCONSIN, ASSIGNOR TO WILLIAM C. STEVENS AND ANSEL DICKINSON, BOTH OF SAME PLACE.

HAY-ELEVATOR.

SPECIFICATION forming part of Letters Patent No. 356,431, dated January 18, 1887.

Application filed September 18, 1886. Serial No. 213,891. (No model.)

*To all whom it may concern:*

Be it known that I, PETER G. STRICKLER, of Janesville, in the county of Rock and State of Wisconsin, have invented certain new and useful Improvements in Hay Elevators and Carriers; and I do hereby declare the following to be a full, clear, and exact description of the invention, such as will enable others skilled in the art to which it appertains to make and use the same.

My invention relates to an improvement in hay elevators and carriers.

It has particular reference to that class of elevators in which a bail or upwardly-extending prong or arm on the movable block is adapted to close a pair of gripping-clutches, and a gravity-key is adapted to fall between the jaws and lock them in adjustment, the jaws being released at the proper time by means of the lifting of the key by a cam.

The object is to provide a gravity-key and gripping-clutch of improved construction, and to so modify the parts in connection therewith that the whole may be furnished at a reduced cost and at the same time be more substantial and operate with greater precision than those hitherto constructed.

With these ends in view my invention consists in certain features of construction and combinations of parts, as will be hereinafter described, and pointed out in the claims.

In the accompanying drawings, Figure 1 is a view of the elevator in side elevation, partly in section, and Figs. 2, 3, and 4 are detached views of parts.

A A' represent two gripping-jaws pivotally secured in the main frame of the carriage B.

The jaws A A' are preferably provided with concave or cup-shaped sockets $a$, formed in the ends of lateral projections $A^2$, and adapted to receive the rounded points of pivotal pins or studs $c$, set in the sides of the carriage, or cast integral therewith. This method of hanging the jaws admits of their being cast solid and does away with the necessity of using pivotal bolts, the jaws being held in place on their pivots by the sides of the carriage bolted together. Instead of forming the pivotal pins or studs on the sides of the carriage and socket-bearings on the jaws, the socket-bearings might be formed in the sides of the carriage and the jaws be provided with trunnions adapted to rock in the sockets. The jaws, at their lower ends, curve toward each other, and are provided with semicircular recesses D, which, when the ends meet, are adapted to embrace the neck of the plunger or bail, as will hereinafter appear.

The adjacent faces of the jaws, at points about on a plane with their pivotal supports, are provided with arms, as follows: The jaw A' has a tooth or arm, $d$, projecting centrally from its inner face, and with a shoulder, $d'$, located below said arm or tooth. The other jaw, A, has a tooth or arm, $e$, adapted to rest on the top of the tooth or arm $d$, and a shorter tooth or arm, $e'$, adapted to rest below the tooth or arm $d$, and when the jaws are closed around the plunger or bail of a block the free end of this lower tooth or arm rests against or in contact with the shoulder $d'$. By thus intergearing the jaws they are caused to move in unison, and a pressure tending to close one jaw also tends to close the other jaw.

The upper ends of the jaws are inclined upwardly and backwardly from their adjacent faces, as shown at G.

When the jaws A A' have their lower ends in contact and the arm $d$ in position between the arms $e$ and $e'$, there is just room enough between the upright shoulders F to freely admit the key H, which, as is plainly evident, will lock the jaws in closed adjustment when in such position. The key H consists, essentially, of a rectangular-shaped block provided with a T-shaped projection, $h$, on its upper end and with guide-ribs $h'$ on its edges. The guides $h'$ are adapted to be received in grooves or channels I, formed in the sides of the carriage, and serve to hold the key from a rocking motion when the T-shaped portion comes in contact with the cam, thereby causing it to descend truly and surely into the space between the shoulders F. This is an important feature, as the swaying of the key back and forth in the direction of the movement of the carriage is apt to hinder its fall between the upper ends of the jaws, and thereby become an annoyance.

K represents a circular hollow cam secured to the under side of the track, and adapted to receive the ends of the cross-head on the T portion of the key in projecting lips *k*, formed on the inner faces of its sides.

The plunger or bail secured to the movable block is provided with an enlarged head, L, between which and the main portion is the reduced neck *l*, which the lower ends of the jaws are adapted to embrace.

As the plunger or bail L *l* is raised between the lower ends of the open jaws A A' its head will strike the arm *e'* and lift it. This movement of the arm *e'* will also lift the arm *d*, and the lower ends of the two jaws will be thereby closed around the neck *l* of the plunger. As soon as the two jaws are closed the key, which while the jaws were open rested with its lower end on the curved upper ends of the jaws, and was thereby locked in the uppermost portion of the double cam, is free to drop into its seat between the walls or shoulders F, which it does as the carriage starts on its course.

At the point where it is desirable to deposit the load another cam may be located, which, as the key engages therewith, draws the key out of its seat and allows the jaws to open and the block to descend for the purpose of taking another load or depositing its load. With this improved locking device a load may be taken up or lowered at any desired point.

Having fully described my invention, what I claim as new, and desire to secure by Letters Patent, is—

1. In an elevator and carrier, the combination, with a pair of gripping-jaws pivoted to the sides of the carriage and provided with gear or arms, of a vertically-sliding key adapted to fall between the upper ends of the jaws and lock the lower ends of the jaws in closed adjustment, substantially as set forth.

2. In a hay elevator and carrier, the combination, with a pair of gripping-jaws pivoted to the sides of the carriage, substantially as set forth, and provided with operating-gear, of a key provided with guide-ribs on its edges adapted to work on lips in the sides of the carriage, substantially as set forth.

3. In a hay elevator and carrier, the combination, with the double cam provided with lips on the inner faces of its sides, the T-headed key adapted to engage the lips and provided with guide-ribs on its edges, and the jaws provided with the curved lower ends and overlapping operating-arms, of the plunger or bail, with its enlarged head and contracted neck adapted to be embraced by the lower ends of the jaws, substantially as set forth.

4. In a hay elevator and carrier, the combination, with a carriage having grooves or channels therein and gripping-jaws pivoted to said carriage, of a gravity-key provided with guide-ribs on its edges extending in the direction of its movement, the said guide-ribs resting in the grooves or channels in the carriage, substantially as set forth.

5. In a hay elevator and carrier, a pair of gripping-jaws, one of the jaws having a single operating-arm and the other jaw having arms adapted to engage, respectively, the upper and lower faces of the single arm on the first-mentioned jaw, the upper ends of the jaws being curved in the manner and for the purpose substantially as set forth.

In testimony whereof I have signed this specification in the presence of two subscribing witnesses.

PETER G. STRICKLER.

Witnesses:
J. W. BATES,
WILLIAM C. STEVENS.